May 23, 1939.    P. A. MASCHWITZ    2,159,746
METHOD FOR PROMOTING AND CONTROLLING THE
POLYMERIZATION OF HYDROCARBON GASES
Filed May 31, 1935
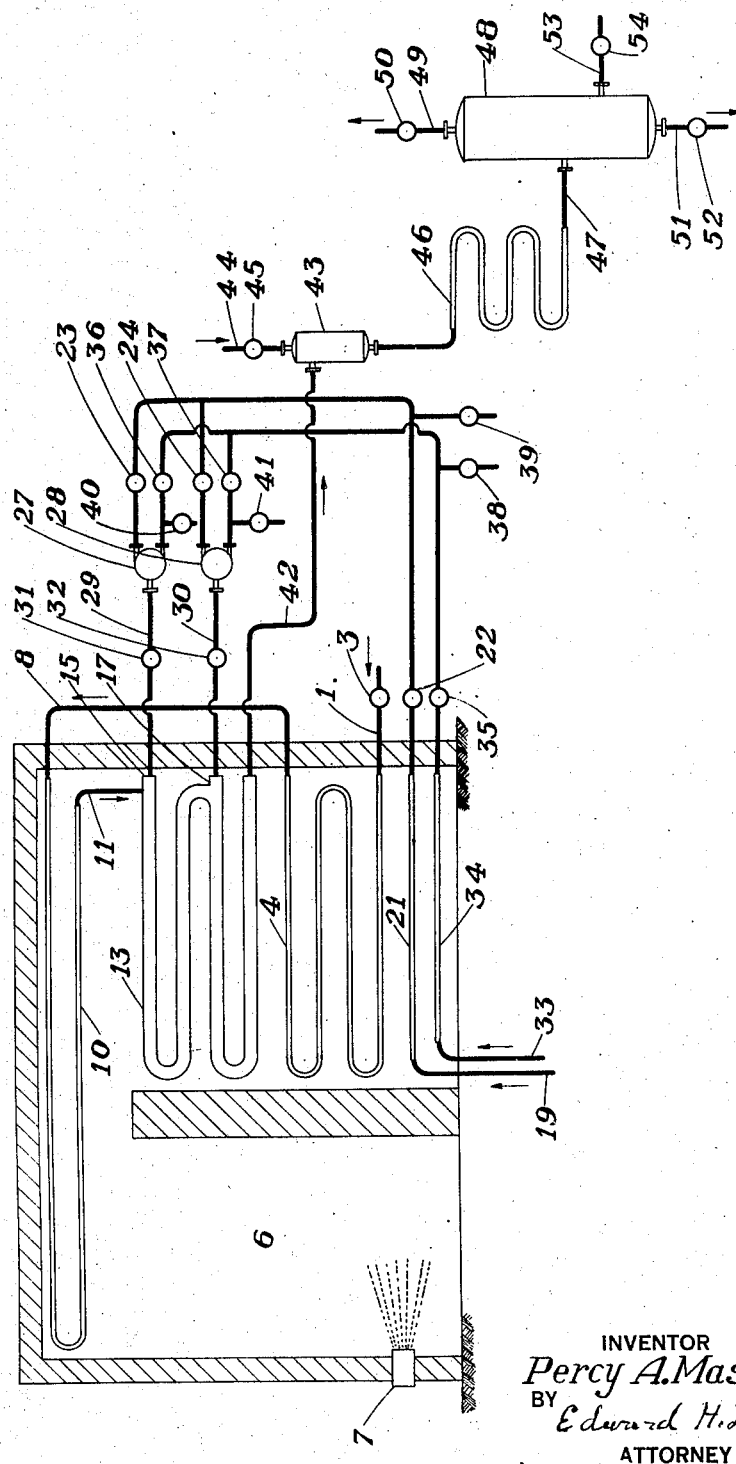
INVENTOR
*Percy A. Maschwitz*
BY *Edward H. Lang*
ATTORNEY Patented May 23, 1939

2,159,746

UNITED STATES PATENT OFFICE 2,159,746

METHOD FOR PROMOTING AND CONTROLLING THE POLYMERIZATION OF HYDROCARBON GASES

Percy A. Maschwitz, Chicago, Ill., assignor to The Pure Oil Company, Chicago, Ill., a corporation of Ohio Application May 31, 1935, Serial No. 24,312

16 Claims. (Cl. 196—10)

This invention relates to a method and apparatus for the polymerization of hydrocarbon gases to form heavier hydrocarbons embodying means to promote the formation and polymerization of olefins, and means to effect control of the temperature and time of the reaction.

Previous practice by those skilled in the art of polymerizing gaseous mixtures containing ethylene, propylene and butylene, has been to heat the gases by external means to an elevated temperature sufficient to initiate the reaction, and then to effect control of the temperature by allowing the heat of the reaction to be dissipated from the apparatus by radiation or by the use of other suitable indirect heat exchange means. Moreover, it has in the past been necessary to use high furnace temperatures to permit the gases to acquire the necessary heat to undergo desired reactions, thereby necessitating the use of special alloy tubes.

My invention is an improvement on previous methods and avoids the use of high furnace temperatures and also permits precise control of the temperature of the reactants throughout the process. Air or oxygen may be mixed with hydrocarbon gases and their heating effected by controlled and partial oxidation. The presence of oxygen in a system containing olefinic gases undergoing polymerization causes the initial reaction to take place at lower temperatures and pressures.

In accordance with my invention steam and air mixtures or steam and oxygen mixtures or mixtures of all three may be introduced at a plurality of points in the stream of gases undergoing treatment. The use of properly controlled mixtures of the three constituents will effect either heating or cooling at any point in the stream of reacting gases. A mixture containing a comparatively large proportion of oxygen when introduced will tend to raise the temperature of the stream due to the exothermic heat of oxidation and polymerization while one consisting largely or entirely of steam tends to slow up the reaction by diluting the reactants and by absorption of sensible heat.

One of the objects of my invention in the use of steam, air, and/or oxygen mixtures lies in the ability to vary the velocity of the reacting gases through the apparatus without changing the rate of feed of the hydrocarbon gas charge and thereby control the time of the reaction of the gases under any chosen conditions of temperature and pressure. The temperature through the apparatus may be varied at will so that the nature of the products may be greatly influenced thereby. It has been found that the liquid products will be largely aromatics, namely, benzol, toluol, xylol, naphthalene and the like, when the olefinic gases are subjected to high reaction temperatures of the order 1200° to 1300° F. for 5 to 50 seconds at atmospheric or low super-atmospheric pressures. At lower temperatures of the order of 1000° F. and at a pressure of approximately 600 pounds per square inch with a reaction time of about 100 seconds, the liquid products will be largely cyclic hydrocarbons including naphthenes, aromatics, and some olefins.

A further object of my invention is the control of the temperature gradient through the apparatus. It has been found that the effect of a gradually rising temperature through the reaction zone with the temperature at its maximum at the outlet of said zone, will produce different products from those obtained by allowing the reactants to reach their maximum temperature near the beginning of the reaction zone and causing the temperature to drop through the remainder of the zone. The effect of this decreasing or increasing temperature gradient through the reaction zone is most marked upon the character of the liquid products having a boiling range above that of U. S. motor gasoline. In the case of an increasing temperature gradient the heaviest or tar-like products will be highly polymerized resins insoluble in part in the lighter liquid products. In the case of a decreasing temperature gradient these insoluble resins will undergo molecular rearrangement in the cooler portions of the reaction zone and all the heavy polymers will be soluble in the lighter liquid products.

Another object of the invention is to control the temperature of the gases in such a manner as to attain cracking conditions in the inlet end of the reaction zone with the attendant decomposition of paraffinic gases to products containing gaseous olefins which may be polymerized subsequently in the cooler latter portion of the reaction zone into liquid products.

A further object of my invention lies in the prevention of carbon formation in the reaction zone which is usually the result of poorly controlled polymerization reactions in which local overheating of the reactants is allowed to occur. The presence of steam itself will also inhibit the formation of carbon and may at elevated temperatures actually dissociate and take part in the reaction and combine with the carbon at the time of its formation.

Still another object is the use of steam admixed with oxygen to provide for the control of the extent of the oxidation of the hydrocarbons and the formation of undesirable products such as carbon dioxide, carbon monoxide, and carbon, which will result from a too violent interaction of oxygen or air and hydrocarbons when not modified by the presence of steam.

Further objects of my invention will appear from the following detailed description considered in conjunction with the accompanying drawing which indicates diagrammatically in elevation one form of apparatus that is suitable to my invention. It is not intended, however, to limit the invention to this particular type of apparatus.

The gas to be processed may consist of a mixture of gaseous hydrocarbons such as are produced in the cracking of oil or gas and in general any hydrocarbon gas, preferably those which contain ethylene, propylene, or butylene. Gases produced from destructive distillation of coal containing olefins may also be employed.

The gas enters the apparatus through the pipe 1 and the valve 3 controls the rate of flow into the preliminary heating coil 4 situated in the convection section of the furnace 6 fired by the burner 7. The heated gas then passes through the pipe 8 into the radiant section of the furnace through the coil 10 in which the gas is raised to a temperature below that sufficient to induce substantial polymerization or cracking but high enough to permit oxidation and heating to take place on the introduction of air or oxygen. The gas passes through the pipe 11 into the reaction zone 13, shown in the form of a coil, which is of greater cross-sectional area than the pipes comprising the gas heating elements. The reaction zone 13 may take the form of a coil as shown, which for convenience may be housed in a cooler portion of the furnace to prevent heat losses by radiation. The temperature of the combustion gases surrounding the reaction zone 13 may be of approximately the same temperature as the maximum temperature of the reacting gases inside the zone so that there will be no material exchange of heat between this external medium and the reacting gases. In some cases the reaction temperature may exceed the temperature of the combustion gases. The reaction zone 13 may take other convenient forms such as an enlarged chamber or coil outside the furnace and suitably insulated or jacketed to prevent heat losses. The reaction zone may be lined on the inside with heat resisting refractory material such as fire brick or refractory clay or the like which may be designed to protect the outside shell of the reaction zone which may be fabricated of mild steel. The inside lining may be of such composition or have impregnated therein substances calculated to have a catalytic effect to promote the cracking, polymerization, and/or oxidation of the reacting gases. Moreover, the reaction zone may be filled with a catalyst in a granular or porous form or with a catalyst supported upon a suitable vehicle. Although I have disclosed the use of catalysts in the reaction zone, it is to be understood that the process may be carried out in the absence of catalysts.

At any number of points in the reaction zone 13, mixtures of air and/or oxygen and steam, or any one singly, may be introduced through a proportionating and mixing or other device. Two connections for the purpose are shown on the drawing at 15 and 17.

The air and/or oxygen may be passed through the pipe 19 into the heating coil 21 located in the lower convection section of the furnace 6 through the control valves 22, 23 and/or 24 into the proportioning devices 27 and/or 28 through the pipes 29 and/or 30 and control valves 31 and/or 32 into the reaction zone 13 at the points 15 and/or 17. Steam, in a manner similar to that described for air and oxygen, may be passed through the pipe 33 into the heating coil 34 through the control valves 35, 36 and/or 37 into the proportioning devices 27 and/or 28 to be mixed with the air or oxygen. The air, oxygen and steam may by-pass the heating coils 21 and 34 through valve controlled by-pass lines 38 and 39 if it is desired to introduce them into the reaction zone at a lower temperature. Water may be introduced through valve controlled lines 40 and 41 into the reaction zone for cooling purposes. The proportioning devices may be automatically controlled by means of thermal responsive elements placed at suitable points in the reaction zone.

The products of the reaction pass out of the reaction zone through the pipe 42 into a reaction arrester 43. A cold liquid is sprayed into the arrester through the line 44 and control valve 45. The mixture then passes through the cooler and condenser 46 and pipe 47 into the separator 48. Uncondensed products are withdrawn from the top of the separator through pipe 49 controlled by valve 50, condensed steam may be withdrawn from the bottom of the separator through pipe 51 controlled by valve 52, and condensed hydrocarbons may be withdrawn from an intermediate point of the separator through pipe 53 controlled by valve 54. The condensed steam will contain in solution various products of oxidation of the hydrocarbon gases which include alcohols, ketones, aldehydes, and acids. The liquid hydrocarbon products may also contain some oxidation products in solution. The uncondensed products may be recirculated through the process if it is desired, by returning them through a line (not shown) to the pipe 1, or they may be subjected to some treatment for the extraction of liquid hydrocarbons held as vapors and subsequently returned to the process.

In carrying out my process, hydrocarbon gases containing from substantially 0 to 100 per cent olefins may be used. The gas may be compressed to a pressure between slightly super-atmospheric to 2000 pounds or more per square inch, and may be heated to a temperature between 500° and 1100° F. before entering the reaction zone. The oxygen and steam mixture may be introduced first at the inlet of the reaction zone, the mixture to contain preferably not more than 20% of oxygen and will be added in amount materially less than sufficient to cause oxidation of all the hydrocarbon gases to carbon dioxide and water. It is preferable to add oxygen in amount between 0.1 and 5 per cent of the total volume of hydrocarbon gases. The effect hereby produced will be to raise the temperature of the reactants to 700° to 1400° F. The temperature desirable will depend upon the composition of the gas being processed, the type of products that are desired, and the pressure under which the system is operated. The time that the gases are allowed to remain in the reaction zone may be between 5 to 500 seconds. As the gases pass through the reaction zone the temperature is observed and steam and oxygen mixtures may be added at other points in a manner similar to that in which they are introduced at the inlet of the reaction zone to effect control. Usually the greatest proportion of oxygen will be added at the inlet connection and subsequent additions will contain higher proportions of steam or steam only. The reaction temperature is in this manner prevented from becoming too high and deposition of carbon avoided.

As one example of carrying out my invention, a gas containing 60 to 70 per cent of olefins consisting largely of butylene, propylene and a lesser amount of ethylene with the balance consisting largely of butane, propane, and a lesser amount of ethane, may be heated to a temperature of 800° to 1100° F. under 10 to 100 pounds per square inch pressure. The heated gases may be mixed with sufficient air and steam in the reaction zone to raise the temperature to about 1150° to 1350° F. and the products may be maintained at the reaction temperature for about 5 to 50 seconds. The resulting liquid hydrocarbons will be chiefly aromatic in character.

As a second example of my invention, a gas containing 10 to 20 per cent of olefins consisting largely of butylene and propylene with the balance consisting largely of butane and propane, may be heated to a temperature of 900° to 1200° F. under 10 to 100 pounds per square inch pressure. The temperature in this case after preliminary heating may be rapidly raised in the reaction zone by the addition of steam and oxygen to about 1300° to 1500° F. and sustained for about 1 to 10 seconds and then reduced to about 1150° to 1350° F. by the addition of steam and sustained for another period of 5 to 50 seconds. During the period of highest temperature a portion of the paraffinic gases will decompose to products containing gaseous olefins, and during the period at 1150° to 1350° F. the remaining original olefins and those formed in the previous period polymerize to liquid aromatics.

As a third example of my invention, a gas such as that disclosed in the first example may be charged to the heating zone at a pressure of from 500 to 2000 pounds per square inch more or less and heated therein to a temperature of approximately 500° to 800° F. The heated gases are then mixed with sufficient oxygen and/or air and steam and/or water to raise the temperature to and maintain it at 700° to 1050° F. for a period of about 50 to 500 seconds. It may be necessary to inject water into the reaction zone when using high pressures due to the high temperature of steam at these pressures. The liquid hydrocarbons resulting from the process will be chiefly cyclic hydrocarbons including naphthenes and aromatics. A minor proportion will be olefinic.

As a fourth example of my invention, hydrocarbon gases similar to those described in Example 1 may be heated to about 750° F. under pressure of approximately 600 pounds per square inch. The heated gases may be then admixed with sufficient oxygen or air and/or steam or water to raise the temperature thereof to about 950° F. As the reaction proceeds the temperature will rise on account of its exothermicity. The reaction may be controlled so as to permit the temperature to reach approximately 1025° F. The total polymerization time may be about 100 seconds. The resulting products will contain resins which are insoluble in the lighter liquid fractions and will separate as a semi-solid mass upon cooling. These resins find use in the industrial arts.

Although I have described specific examples of my invention it will be understood that the invention is not limited to the conditions of time, temperature, and pressure set forth therein but is intended to cover a wide range of operating conditions in which oxygen containing gas, steam and/or water are utilized to control gas polymerization processes.

What I claim is:

1. The process of polymerizing olefinic hydrocarbon gases to heavier hydrocarbon which comprises heating said gases to a temperature insufficient to induce substantial polymerization, but sufficient to induce oxidation when mixed with free oxygen containing gas, mixing with the heated gas an amount of free oxygen containing gas sufficient to react with only a small portion of the hydrocarbon gases to raise the temperature of the gases to a point sufficient to induce active polymerization in the absence of oxygen, mixing sufficient steam or water with the reacting gases to maintain the reaction temperature within the desired polymerizing range, maintaining the gases in the polymerization zone for a period of time sufficient to convert a substantial portion thereof to heavier compounds, cooling the reaction products, and separating the uncondensed fractions therefrom.

2. The process of converting hydrocarbon gases to higher boiling compounds which comprises heating said gases to a temperature insufficient to induce substantial cracking, but sufficient to induce oxidation in the presence of a free oxygen containing gas, mixing with the heated gas, a free oxygen containing gas insufficient quantity to react with only a small portion of the hydrocarbon gases and to raise the temperature of the hydrocarbon gases to cracking temperature, maintaining the gases at cracking temperature for a sufficient period of time to crack a substantial portion thereof to olefinic hydrocarbons, mixing with the cracked gases sufficient steam or water to lower the temperature of the gases to the desired polymerizing range, maintaining the gases at the lower temperature for a period of time sufficient to polymerize a substantial portion of said olefinic hydrocarbons to heavier compounds, cooling the reaction products, and separating the uncondensed fractions therefrom.

3. Process in accordance with claim 1 in which the gases are heated in the initial stage to a temperature of 500° to 800° F. and maintained in the reaction zone at temperatures of 700° to 1050° F. under pressures of approximately 500 to 2000 pounds per square inch.

4. Process in accordance with claim 1 in which the gases are maintained in the reaction zone for a period of 50 to 500 seconds at a temperature of 700° to 1050° F. under pressure of approximately 500 to 2000 pounds per square inch.

5. Process in accordance with claim 1 in which the proportion of oxygen to steam that is admixed with the hydrocarbon gas in the initial stages of the reaction zone is greater than the proportion of oxygen to steam introduced at later stages of the reaction zone.

6. The process in accordance with claim 1 in which the gas is heated in the heating zone to a temperature of 800° to 1100° F. and sufficient free oxygen-containing gas and steam or water are admixed therewith to raise the temperature to 1150° to 1350° F. and the gases are maintained at a pressure of 10 to 100 pounds per square inch in the reaction zone.

7. The process in accordance with claim 1 in which the gas is heated in the heating zone to a temperature of 800° to 1100° F. and sufficient free oxygen-containing gas and steam or water are admixed therewith to raise the temperature to 1150° to 1350° F. and the gases are maintained at the reacting temperature for approximately 5 to 50 seconds under a pressure of 10 to 100 pounds per square inch.

8. Process in accordance with claim 2 in which the gases are heated in a heating zone to a temperature of approximately 900° to 1200° F. and sufficient free oxygen-containing gas and steam are admixed with the heated gases to raise the temperature thereof to about 1300° to 1500° F., maintaining the gases at the latter temperature for a relatively short period of time, then cooling the gases to approximately 1150° to 1350° F. by injection of additional quantities of steam or water, and maintaining the gases at the latter temperature for a longer period of time than that for which they were subjected to the higher temperature.

9. Process in accordance with claim 2 in which the gases are heated in a heating zone to a temperature of approximately 900° to 1200° F. and sufficient free oxygen-containing gas and steam are admixed therewith to raise the temperature to about 1300° to 1500° F., maintaining the gases at the latter temperature for approximately 2 to 10 seconds, cooling the gases to approximately 1150° to 1350° F. by injection of additional quantities of steam or water, and maintaining the gases at the latter temperature for about 5 to 50 seconds.

10. Process in accordance with claim 2 in which free oxygen-containing gas and steam or water are injected into the reaction zone at a plurality of points.

11. Method of polymerizing olefinic hydrocarbon gases to heavier hydrocarbons which comprises heating the gases to a temperature insufficient to induce substantial polymerization, mixing with the heated gases sufficient free oxygen-containing gas and steam or water to react with only a small portion of the olefinic gases and to raise the temperature sufficiently to initiate the polymerization reaction in the absence of oxygen, passing the mixture through an elongated reaction zone, permitting the temperature of the gases near the outlet of the reaction zone to rise above the initial but not in excess of the optimum polymerizing temperature range, cooling the reaction products, and separating the uncondensed fractions therefrom.

12. Method in accordance with claim 11 in which the gases in the reaction zone are maintained at a pressure of from 500 to 2000 pounds per square inch and the temperature is not allowed to exceed approximately 1050° F.

13. The method of converting hydrocarbon gases to higher boiling hydrocarbons which comprises preheating said gases to active oxidation temperature but below active conversion temperature, mixing with the preheated gases sufficient free oxygen-containing gas to react with only a small portion of said hydrocarbon gases and to raise the temperature to the desired conversion range, and maintaining the temperature of the reacting gases within the desired range by mixing with steam or water and free oxygen-containing gas at a plurality of points in amounts proportioned in accordance with the temperature of the reacting gases at the points of introduction.

14. The method of converting olefinic hydrocarbon gases to liquid hydrocarbons which comprises preheating a stream of gases to a temperature at which active oxidation will take place but below a temperature at which substantial polymerization occurs, passing the preheated gases into an enlarged reaction zone, mixing with said gases at a point adjacent the inlet of said enlarged zone, a free oxygen-containing gas in sufficient quantities to react with only a small portion of said hydrocarbon gases and to raise their temperature to the desired polymerizing temperature, and controlling the temperature in said reaction zone by addition of free oxygen-containing gas and steam or water in amounts proportioned in accordance with the temperature of the reacting gases at the points of introduction.

15. In a method of converting hydrocarbon gases to liquid hydrocarbons the steps which comprise passing said gases in a stream through a preheating zone in which the gases are heated by means of combustion gases to a temperature sufficient to promote oxidation of said gases but insufficient to promote conversion of said gases in the absence of oxygen, passing the preheated gases into a second zone in which the gases are mixed with sufficient free oxygen-containing gas to react with only a small portion of said hydrocarbon gases and to raise the temperature thereof to active conversion temperature, said second zone being blanketed by a medium at a temperature not substantially above the temperature of the gases undergoing conversion.

16. The steps in a method in accordance with claim 15 in which the second zone is blanketed with combustion gases previously used to preheat the hydrocarbon gases to oxidation temperature.

PERCY A. MASCHWITZ.